(12) United States Patent
Ji et al.

(10) Patent No.: US 11,132,346 B2
(45) Date of Patent: Sep. 28, 2021

(54) INFORMATION PROCESSING METHOD AND APPARATUS

(71) Applicant: Huawei Technologies Co., Ltd., Shenzhen (CN)

(72) Inventors: Zhenfeng Ji, Xi'an (CN); Li Su, Xi'an (CN); Kangzhan Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/601,299

(22) Filed: Oct. 14, 2019

(65) Prior Publication Data

US 2020/0042507 A1 Feb. 6, 2020

Related U.S. Application Data

(63) Continuation of application No. PCT/CN2018/083123, filed on Apr. 13, 2018.

(30) Foreign Application Priority Data

Apr. 14, 2017 (CN) .......................... 201710245985.8

(51) Int. Cl.
 *G06F 16/22* (2019.01)
 *G06F 16/2453* (2019.01)
 (Continued)

(52) U.S. Cl.
 CPC ...... *G06F 16/2237* (2019.01); *G06F 16/2282* (2019.01); *G06F 16/248* (2019.01);
 (Continued)

(58) Field of Classification Search
 None
 See application file for complete search history.

(56) References Cited

U.S. PATENT DOCUMENTS

| | | | |
|---|---|---|---|
| 9,052,831 B1* | 6/2015 | Stefani | G06F 3/0619 |
| 2012/0117057 A1* | 5/2012 | Adimatyam | H04N 21/4147 |
| | | | 707/723 |

(Continued)

FOREIGN PATENT DOCUMENTS

| | | |
|---|---|---|
| CN | 1980179 A | 6/2007 |
| CN | 101141389 A | 3/2008 |

(Continued)

OTHER PUBLICATIONS

Machine Translation and Abstract of Chinese Publication No. CN102890678, Jan. 23, 2013, 18 pages.

(Continued)

*Primary Examiner* — Kim T Nguyen
(74) *Attorney, Agent, or Firm* — Conley Rose, P.C.

(57) ABSTRACT

An information processing method and apparatus, where the method includes: obtaining a user information table; creating, based on the user information table, a bitmap index including a plurality of bitmap vectors; creating a user identifier array based on the user information table; receiving a query request sent by a client; querying the user information table based on the bitmap index, the user identifier array, and at least one attribute value, to obtain a query result; and sending the query result to the client. In the foregoing manner, second-level indexing for an ad hoc query can be implemented.

20 Claims, 7 Drawing Sheets

(51) Int. Cl.
*G06F 16/2455* (2019.01)
*G06F 16/27* (2019.01)
*G06F 16/2457* (2019.01)
*G06F 16/248* (2019.01)

(52) U.S. Cl.
CPC .. *G06F 16/24537* (2019.01); *G06F 16/24561* (2019.01); *G06F 16/24578* (2019.01); *G06F 16/278* (2019.01)

(56) References Cited

U.S. PATENT DOCUMENTS

| | | | |
|---|---|---|---|
| 2013/0132431 | A1* | 5/2013 | Platt .................. G06Q 10/10 707/770 |
| 2013/0151669 | A1* | 6/2013 | Yue .................. G06F 3/0485 709/219 |
| 2013/0262400 | A1 | 10/2013 | Zhou et al. |
| 2014/0129539 | A1* | 5/2014 | Hayes ............... G06Q 30/0256 707/709 |
| 2015/0073719 | A1* | 3/2015 | Glynias ............. G01N 33/5308 702/19 |
| 2015/0269205 | A1 | 9/2015 | Ma et al. |
| 2016/0189065 | A1* | 6/2016 | Elliott .................. G06Q 10/02 705/5 |
| 2017/0032044 | A1* | 2/2017 | Hayes .................. G06F 16/951 |
| 2018/0039656 | A1* | 2/2018 | McConnell ........... G06F 16/901 |

FOREIGN PATENT DOCUMENTS

| | | |
|---|---|---|
| CN | 101295316 A | 10/2008 |
| CN | 101572647 A | 11/2009 |
| CN | 102622432 A | 8/2012 |
| CN | 102663114 A | 9/2012 |
| CN | 102663116 A | 9/2012 |
| CN | 102890678 A | 1/2013 |
| CN | 103309958 A | 9/2013 |
| CN | 103379136 A | 10/2013 |
| CN | 103530322 A | 1/2014 |
| CN | 103984695 A | 8/2014 |
| CN | 104156407 A | 11/2014 |
| CN | 104361113 A | 2/2015 |
| CN | 104361118 A | 2/2015 |
| CN | 104572994 A | 4/2015 |
| CN | 105550332 A | 5/2016 |
| CN | 105701112 A | 6/2016 |
| CN | 105868388 A | 8/2016 |
| CN | 106250523 A | 12/2016 |
| CN | 106407201 A | 2/2017 |

OTHER PUBLICATIONS

Machine Translation and Abstract of Chinese Publication No. CN103379136, Oct. 30, 2013, 20 pages.
Machine Translation and Abstract of Chinese Publication No. CN106407201, Feb. 15, 2017, 19 pages.
"Use Bitmap Indexes for tags to improve performance #4311," retrieved from internet:https://github.com/influxdata/influxdb/issues/4311 on Mar. 5, 2020, 2 pages.
Hindex, "Secondary Index for Hbase," retrieved from internet:https://github.com/Huawei-Hadoop/hindex on Mar. 5, 2020, 4 pages.
Foreign Communication From A Counterpart Application, PCT Application No. PCT/CN2018/083123, English Translation of International Search Report dated Jul. 13, 2018, 2 pages.
Foreign Communication From A Counterpart Application, PCT Application No. PCT/CN2018/083123, English Translation of Written Opinion dated Jul. 13, 2018, 5 pages.

* cited by examiner

INFORMATION PROCESSING METHOD AND APPARATUS

CROSS-REFERENCE TO RELATED APPLICATIONS

This application is a continuation of International Patent Application No. PCT/CN2018/083123, filed on Apr. 13, 2018, which claims priority to Chinese Patent Application No. 201710245985.8, filed on Apr. 14, 2017. Both of the aforementioned applications are hereby incorporated by reference in their entireties.

TECHNICAL FIELD

The present disclosure relates to the field of information technologies, and in particular, to an information processing method and apparatus.

BACKGROUND

A user information table analyzes and stores various dimensions of information of a user, that is, label information, and can perfectly extract an information outline of the user. To discover a user group having same condition label information, to find requirements of a high-quality user group, the user information table needs to have an ad hoc query capability.

In other approaches, the user information table is usually implemented using a database. For example, a commonly used database is a Hadoop Database (HBase). The HBase is a column-oriented, scalable, distributed storage database with high reliability and high performance. It can be used as a non-relational database in a big data platform and is intended to support random real-time write/read to hundreds-of-millions-level rows and million-level columns.

Featured as highly reliable, column-oriented, and open-source, the HBase is used by more enterprises and users to store and construct a user information table.

For example, a user information table constructed using the HBase is shown in Table 1.

TABLE 1

| User identifier | Gender | Occupation | Label 1 | Label 2 | Label 3 |
|---|---|---|---|---|---|
| 00000001 | Male | Engineer | 1 | 0 | 1 |
| 00000002 | Female | Teacher | 0 | 1 | 1 |
| 00000003 | Male | Driver | 1 | 1 | 0 |
| 00000004 | Male | Teacher | 0 | 0 | 1 |
| 00000005 | Female | Engineer | 0 | 1 | 0 |
| 00000006 | Female | Teacher | 1 | 1 | 0 |
| ... | ... | ... | ... | ... | ... |

In Table 1, the user information table includes user identifiers (for example, rowkey) and user data corresponding to different attributes. The user information table includes a plurality of rows of data. Each row of data records a correspondence between a user identifier and user data.

The user data includes a plurality of attributes. The attributes are gender, occupation, label 1, label 2, and label 3, as shown in Table 1. The attributes include attribute values. For example, in Table 1, the attribute is gender and includes attribute values of male and female; the attribute is label 1 and includes attribute values of 1 and 0, where 1 indicates that there is an attribute of label 1, and 0 indicates that there is no attribute of label 1. The user information table records correspondences between user identifiers and attribute values of a plurality of attributes.

HBase indexes user identifiers, such that it is very fast to query user data based on the user identifiers. However, the HBase does not index a value field used to indicate an attribute value of user data. In a case in which query is performed based on a combination of a particular user attribute value and a label to obtain a user group (AD-HOC) through filtering, the user attribute value can only be queried row by row according to the user identifiers based on a column value filter provided in the HBase. Since the user information table has tens of thousands of rows, due to low performance and a low query speed, an existing technology cannot meet a requirement of obtaining, through filtering, a user group through an ad hoc query.

To resolve the foregoing technical problem in other approaches, when a user information table is created using the HBase, a second-level index table is created in the HBase, and the second-level index table lists a correspondence between an attribute value and a user identifier. Specifically, by modifying source code of the HBase, a coprocessor provided by the HBase writes an index column into the second-level index table. When a query request specific to a particular user attribute value is obtained, the second-level index table is queried using a coprocessor hook for a user identifier corresponding to the particular attribute value, and then the user information table is queried based on the found user identifier.

However, in other approaches, a large amount of HBase source code needs to be modified, and each time new user data is inserted into the user information table or user data is deleted from the user information table, the second-level index table needs to be modified using the coprocessor. In this case, an original data insertion and deletion process is changed, hindering subsequent maintenance.

SUMMARY

To resolve the foregoing problem in other approaches, embodiments of the present disclosure provide an information processing method and apparatus, to implement second-level indexing for an ad hoc query. Moreover, the information processing method and apparatus can be universally applied to various databases without a need of modifying the databases or changing an original data insertion and deletion process, thereby facilitating subsequent maintenance.

According to a first aspect, an embodiment of the present disclosure provides an information processing method, including: obtaining a user information table, where the user information table includes user identifiers and user data, the user data includes a plurality of attributes, the attributes include attribute values, and the user information table records correspondences between the user identifiers and the attribute values of the plurality of attributes; creating, based on the user information table, a bitmap index including a plurality of bitmap vectors, where each attribute value corresponds to a bitmap vector, and a ranking order of binary numbers in each bitmap vector is consistent with a ranking order of the user identifiers in the user information table; creating a user identifier array based on the user information table, where in the user identifier array, the user identifiers are recorded in the ranking order of the user identifiers in the user information table; receiving a query request sent by a client, where the query request carries at least one attribute value in the plurality of attribute values; querying the user information table based on the bitmap index, the user identifier array, and the at least one attribute value, to obtain a query result; and sending the query result to the client.

In an implementation of this embodiment of the present disclosure, the at least one attribute value includes a first attribute value, the query request carries the first attribute value, the query request is specific to user data having the first attribute value, and the step of querying the user information table based on the bitmap index, the user identifier array, and the at least one attribute value, to obtain a query result includes: selecting, from the bitmap index, a first bitmap vector corresponding to the first attribute value; querying the user identifier array based on the first bitmap vector, to obtain a user identifier having the first attribute value; and querying the user information table for user data that corresponds to the user identifier having the first attribute value, and using the found user data as the query result.

In another implementation of this embodiment of the present disclosure, the at least one attribute value includes a first attribute value and a second attribute value, the query request carries the first attribute value and the second attribute value, the query request is specific to user data having the first attribute value and the second attribute value, and the step of querying the user information table based on the bitmap index, the user identifier array, and the at least one attribute value, to obtain a query result includes: selecting, from the bitmap index, a first bitmap vector corresponding to the first attribute value and a second bitmap vector corresponding to the second attribute value; performing an AND operation on the first bitmap vector and the second bitmap vector; querying the user identifier array based on an operation result, to obtain a user identifier having the first attribute value and the second attribute value; and querying the user information table for user data that corresponds to the user identifier having the first attribute value and the second attribute value, and using the found user data as the query result.

In another implementation of this embodiment of the present disclosure, the at least one attribute value includes a first attribute value and a second attribute value, the query request carries the first attribute value and the second attribute value, the query request is specific to user data having the first attribute value but not having the second attribute value, and the step of querying the user information table based on the bitmap index, the user identifier array, and the at least one attribute value, to obtain a query result includes: selecting, from the bitmap index, a first bitmap vector corresponding to the first attribute value and a second bitmap vector corresponding to the second attribute value; performing a NOT operation on the first bitmap vector and the second bitmap vector; querying the user location mapping table based on an operation result, to obtain a user identifier having the first attribute value but not having the second attribute value; and querying the user information table for user data that corresponds to the user identifier having the first attribute value but not having the second attribute value, and using the found user data as the query result.

In another implementation of this embodiment of the present disclosure, the at least one attribute value includes a first attribute value and a second attribute value, the query request carries the first attribute value and the second attribute value, the query request is specific to user data having the first attribute value or the second attribute value, and the step of querying the user information table based on the bitmap index, the user identifier array, and the at least one attribute value, to obtain a query result includes: selecting, from the bitmap index, a first bitmap vector corresponding to the first attribute value and a second bitmap vector corresponding to the second attribute value; performing an OR operation on the first bitmap vector and the second bitmap vector; querying the user location mapping table based on an operation result, to obtain a user identifier having the first attribute value or the second attribute value; and querying the user information table for user data that corresponds to the user identifier having the first attribute value or the second attribute value, and using the found user data as the query result.

In another implementation of this embodiment of the present disclosure, the user information table is a user data table, or a user data sub-table obtained after the user data table is partitioned.

In another implementation of this embodiment of the present disclosure, the user identifiers are ranked in a preset order in the user information table, and the preset order includes an ascending order and a descending order.

According to a second aspect, an embodiment of the present disclosure provides an information processing apparatus, including: a user data obtaining module, configured to obtain a user information table, where the user information table includes user identifiers and user data, the user data includes a plurality of attributes, the attributes include attribute values, and the user information table records correspondences between the user identifiers and the attribute values of the plurality of attributes; a bitmap index creation module, configured to create, based on the user information table, a bitmap index including a plurality of bitmap vectors, where each attribute value corresponds to a bitmap vector, and a ranking order of binary numbers in each bitmap vector is consistent with a ranking order of the user identifiers in the user information table; a user identifier array creation module, configured to create a user identifier array based on the user information table, where in the user identifier array, the user identifiers are recorded in the ranking order of the user identifiers in the user information table; a receiving module, configured to receive a query request sent by a client, where the query request carries at least one attribute value in the plurality of attribute values; a query module, configured to query the user information table based on the bitmap index, the user identifier array, and the at least one attribute value, to obtain a query result; and a sending module, configured to send the query result to the client.

In an implementation of this embodiment of the present disclosure, the at least one attribute value includes a first attribute value, the query request carries the first attribute value, the query request is specific to user data having the first attribute value, and the query module is configured to: select, from the bitmap index, a first bitmap vector corresponding to the first attribute value; query the user identifier array based on the first bitmap vector, to obtain a user identifier having the first attribute value; and query the user information table for user data that corresponds to the user identifier having the first attribute value, and use the found user data as the query result.

In another implementation of this embodiment of the present disclosure, the at least one attribute value includes a first attribute value and a second attribute value, the query request carries the first attribute value and the second attribute value, the query request is specific to user data having the first attribute value and the second attribute value, and the query module is configured to: select, from the bitmap index, a first bitmap vector corresponding to the first attribute value and a second bitmap vector corresponding to the second attribute value; perform an AND operation on the first bitmap vector and the second bitmap vector; query the user identifier array based on an operation result, to generate a user identifier having the first attribute value and the second attribute value; and query the user information table for user data that corresponds to the user identifier having the first attribute value and the second attribute value, and use the found user data as the query result.

In another implementation of this embodiment of the present disclosure, the at least one attribute value includes a first attribute value and a second attribute value, the query request carries the first attribute value and the second attribute value, the query request is specific to user data having the first attribute value but not having the second attribute value, and the query module is configured to: select, from the bitmap index, a first bitmap vector corresponding to the first attribute value and a second bitmap vector corresponding to the second attribute value; perform a NOT operation on the first bitmap vector and the second bitmap vector; query the user location mapping table based on an operation result, to obtain a user identifier having the first attribute value but not having the second attribute value; and query the user information table for user data that corresponds to the user identifier having the first attribute value but not having the second attribute value, and use the found user data as the query result.

In another implementation of this embodiment of the present disclosure, the at least one attribute value includes a first attribute value and a second attribute value, the query request carries the first attribute value and the second attribute value, the query request is specific to user data having the first attribute value or the second attribute value, and the query module is configured to: select, from the bitmap index, a first bitmap vector corresponding to the first attribute value and a second bitmap vector corresponding to the second attribute value; perform an OR operation on the first bitmap vector and the second bitmap vector; query the user location mapping table based on an operation result, to generate a user identifier having the first attribute value or the second attribute value; and query the user information table for user data that corresponds to the user identifier having the first attribute value or the second attribute value, and use the found user data as the query result.

In another implementation of this embodiment of the present disclosure, the user information table is a user data table, or a user data sub-table obtained after the user data table is partitioned.

In another implementation of this embodiment of the present disclosure, the user identifiers are ranked in a preset order in the user information table, and the preset order includes an ascending order and a descending order.

According to a third aspect, an embodiment of the present disclosure provides an information processing apparatus, including a processor, a memory, and a bus, where the processor and the memory are both connected to the bus, and the memory stores a program instruction to perform the information processing method according to the first aspect.

In conclusion, according to the information processing method and apparatus disclosed in the embodiments of the present disclosure, the bitmap index and the user identifier array are constructed based on the user information table. Because location information of the bitmap index compulsorily depends on a user order of the user information table, and the user data is cold data that does not frequently change, once new user data needs to be added to the user information table (that is, user data needs to be added to a bottommost part of the user information table), only a binary number that indicates whether the newly added user data has a corresponding attribute value needs to be correspondingly added to the rear of each bitmap vector in the bitmap index, to modify corresponding index information. A disabling case rather than a deletion case occurs in the user information table, such that the user data is only disabled instead of being deleted from the user information table. Therefore, when the user data is disabled, the bitmap index does not need to be correspondingly modified. Therefore, the information processing method and apparatus disclosed in the embodiments of the present disclosure can implement second-level indexing for an ad hoc query. Moreover, the information processing method and apparatus can be universally applied to various databases without a need of modifying the databases or changing an original data insertion and deletion process, thereby facilitating subsequent maintenance.

DESCRIPTION OF EMBODIMENTS

Figure 1:
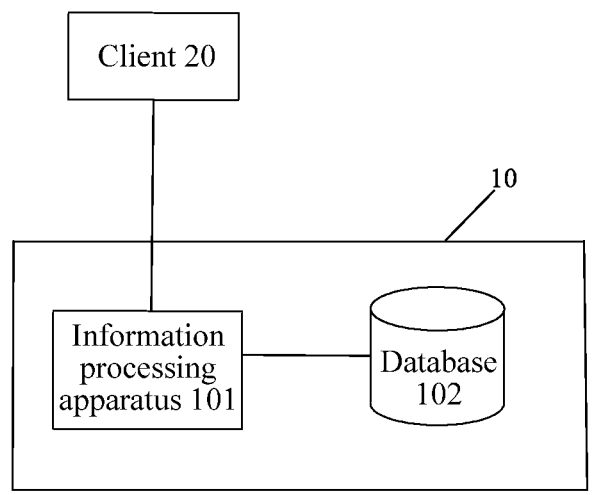
FIG. 1 is a schematic structural diagram of an information processing system according to an embodiment of the present disclosure.

First, FIG. 1 is a schematic structural diagram of an information processing system according to an embodiment of the present disclosure. As shown in FIG. 1, the information processing system includes a client 20 and a server 10, and the server 10 includes an information processing apparatus 101 and a database 102.

The client 20 establishes a network connection to the information processing apparatus 101, the client 20 may send a query request specific to the database 102 to the information processing apparatus 101, the database 102 stores a user information table, and the information processing apparatus 101 may access the database 102.

In some examples, the client 20, the information processing apparatus 101, and the database 102 may be disposed on different servers 10. In this case, the client 20 and the information processing apparatus 101 are connected using a network, and the information processing apparatus 101 and the database 102 are connected using a network.

In some other examples, the client 20, the information processing apparatus 101, and the database 102 may be disposed on a same server 10.

For example, the client 20 may be a browser, providing a page for a user to input a query request. The database 102 may be a distributed database, including, for example, an HBase, a Mongo Database (MongoDB), a Distributed Relational Database Service (DRDS), a Volt Database (VoltDB), and a ScaleBase. The information processing apparatus 101 may be a third-party component independent of the database 102, or implemented as a component built in the database 102.

Figure 2:
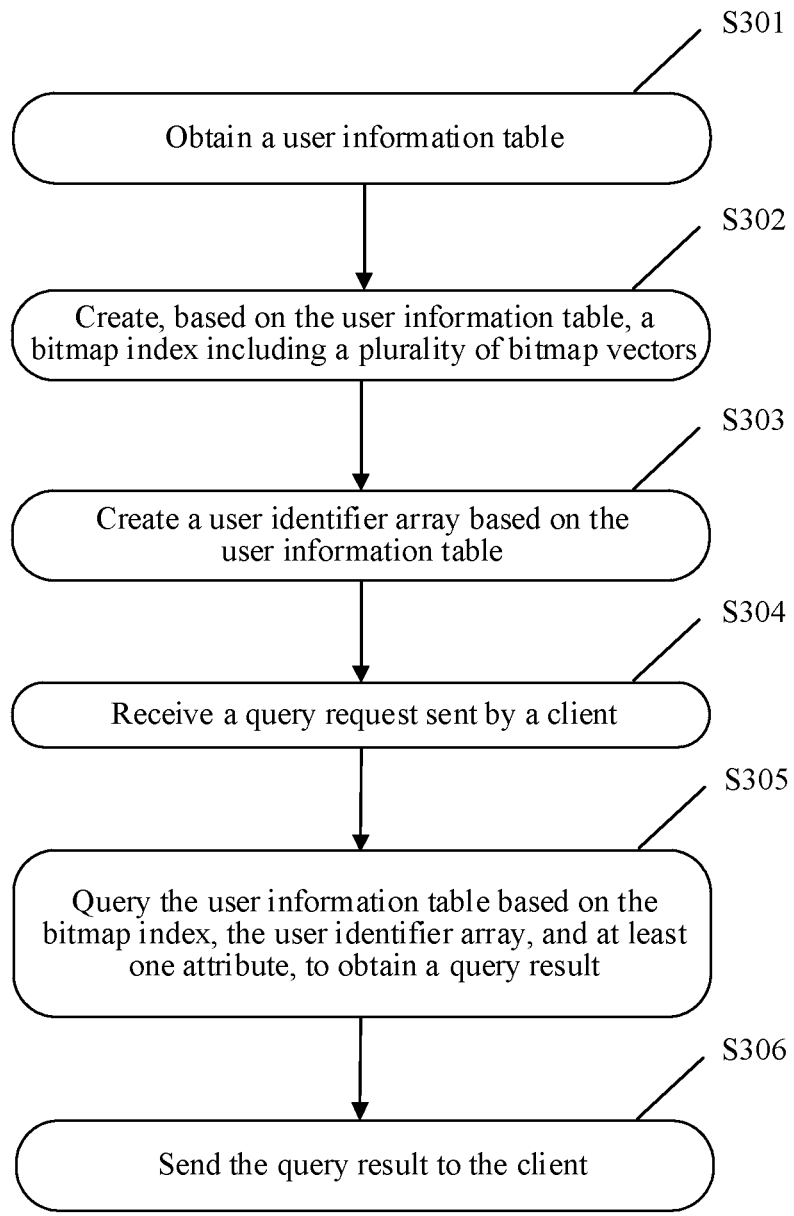
FIG. 2 is a diagram of a procedure of an information processing method according to an embodiment of the present disclosure.

For a further and clear description, refer to FIG. 2. FIG. 2 is a diagram of a procedure of an information processing method according to an embodiment of the present disclosure. As shown in FIG. 2, the information processing method is applied to an information processing apparatus 101, and includes the following steps.

Step S301: Obtain a user information table, where the user information table includes user identifiers and user data, the user data includes a plurality of attributes, the attributes include attribute values, and the user information table records correspondences between the user identifiers and the attribute values of the plurality of attributes.

The user information table is recorded in a database, and the information processing apparatus obtains the user information table from the database.

For example, the user information table may be Table 1 shown in the Background section of the disclosure. In Table 1, user identifiers include 0000001, 00000002, 00000003, 00000004, 00000005, 00000006 . . . . For ease of understanding, the following describes user data corresponding to the first six users in Table 1.

Further, in Table 1, attributes include gender, occupation, and label, and the attributes include attribute values. Labels include label 1, label 2, and label 3. In a label, an attribute value of 1 indicates that a user has an attribute of the label, and an attribute value of 0 indicates that the user does not have an attribute of the label. For example, label 1 may be defined as membership. If an attribute value of label 1 is 1, it indicates that the user has a membership, or if an attribute value of label 1 is 0, it indicates that the user does not have a membership.

Moreover, occupations include engineer, teacher, and driver, and gender includes male and female.

It should be noted that this embodiment of the present disclosure describes only the several attribute values above, and during actual application, the attribute values may be other attribute values that can be conceived of by a person skilled in the art. This is not limited in this embodiment of the present disclosure.

Step S302: Create, based on the user information table, a bitmap index including a plurality of bitmap vectors, where each attribute value corresponds to a bitmap vector, and a ranking order of binary numbers in each bitmap vector is consistent with a ranking order of the user identifiers in the user information table.

For example, the bitmap index may be as shown in Table 2.

TABLE 2

| Attribute value | Bitmap vector |
|---|---|
| Male | 101100 |
| Female | 010011 |
| Label 1 | 101001 |
| Label 2 | 011011 |
| Label 3 | 110100 |
| Engineer | 100010 |
| Teacher | 010101 |
| Driver | 001000 |

The information processing apparatus 101 generates Table 2 based on Table 1. The bitmap index shown in Table 2 includes a plurality of attribute values and a plurality of bitmap vectors. In the bitmap vector, 1 indicates that there is a corresponding attribute value, 0 indicates that there is no corresponding attribute value. For example, the attribute value is "male" and a corresponding bitmap vector is 101100. A ranking order of binary numbers in 101100 is consistent with the ranking order of the user identifiers in the user information table. Therefore, 101100 indicates that the first user (whose user identifier is 00000001) in the user information table shown in Table 1 is male, the second user (whose user identifier is 00000002) is not male, the third user (whose user identifier is 00000003) is male, the fourth user (whose user identifier is 00000004) is male, the fifth user (whose user identifier is 00000005) is not male, and the sixth user (whose user identifier is 00000006) is not male.

Other bitmap vectors are similar to the example above, and are not repeatedly described herein.

Step S303: Create a user identifier array based on the user information table, where in the user identifier array, the user identifiers are recorded in the ranking order of the user identifiers in the user information table.

For example, a user identifier array created based on the user information table shown in Table 1 is:

[0000001, 00000002, 00000003, 00000004, 00000005, 00000006].

In the user identifier array, a ranking order of user identifiers is consistent with the ranking order of the user identifiers in Table 1.

It should be noted that, the user identifiers in Table 1 are ranked in a preset order in the user information table, and the preset order is an ascending order. In some other examples, the preset order may be a descending order. The user identifiers are ranked in the preset order, such that a speed of searching for a corresponding attribute value based on a user identifier can be increased.

Step S304: Receive a query request sent by a client 20, where the query request carries at least one attribute value in the plurality of attribute values.

Step S305: Query the user information table based on the bitmap index, the user identifier array, and the at least one attribute value, to obtain a query result.

A query manner of this step is described below using an example.

Figure 3:
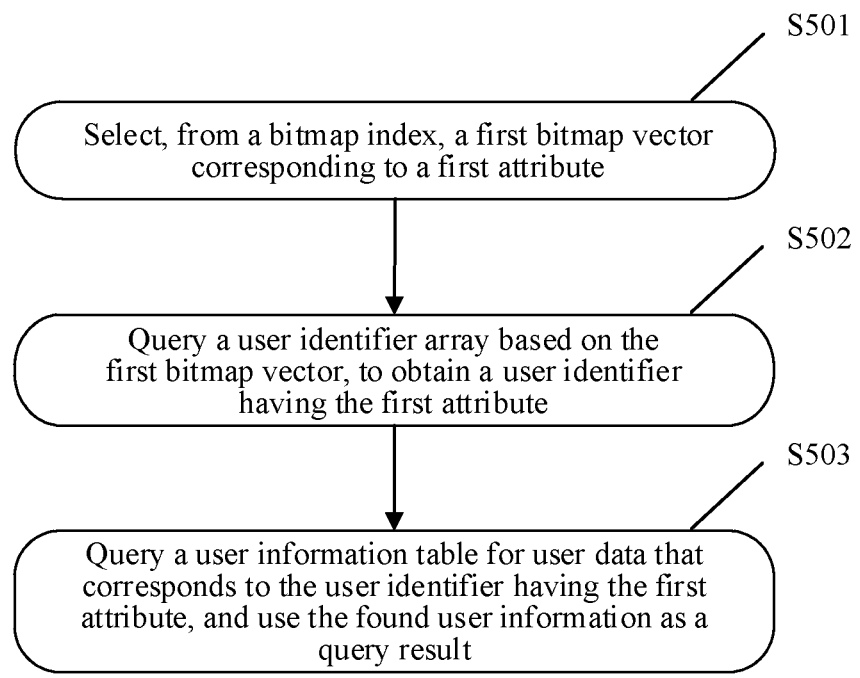
FIG. 3 is a diagram of a sub-procedure of an information processing method according to an embodiment of the present disclosure.

A case in which the at least one attribute value includes a first attribute value, and the query request is specific to user data having the first attribute value is described first. For details, refer to FIG. 3. FIG. 3 is a diagram of a sub-procedure of the information processing method according to this embodiment of the present disclosure. In the method shown in FIG. 3, the query request described in step S304 carries the first attribute value and is specific to the user data having the first attribute value. In this case, step S305 includes the following steps.

Step S501: Select, from the bitmap index, a first bitmap vector corresponding to the first attribute value.

For example, the first attribute value is "male". An attribute value of "male" is selected based on Table 2, and a first bitmap vector corresponding to "male" is 101100. It indicates that the first, third, and fourth users in Table 1 meet the condition.

Step S502: Query the user identifier array based on the first bitmap vector, to obtain a user identifier having the first attribute value.

For example, [0000001, 00000002, 00000003, 00000004, 00000005, 00000006] is queried based on 101100 for the first, third, and fourth places, and it may be learned that user identifiers whose attribute value is "male" include 0000001, 0000003, and 00000004.

Step S503: Query the user information table for user data that corresponds to the user identifier having the first attribute value, and use the found user data as the query result.

For example, Table 1 may be queried for user data that corresponds to the user identifiers 0000001, 0000003, and 00000004, and the user data may be used as the query result.

Figure 4:
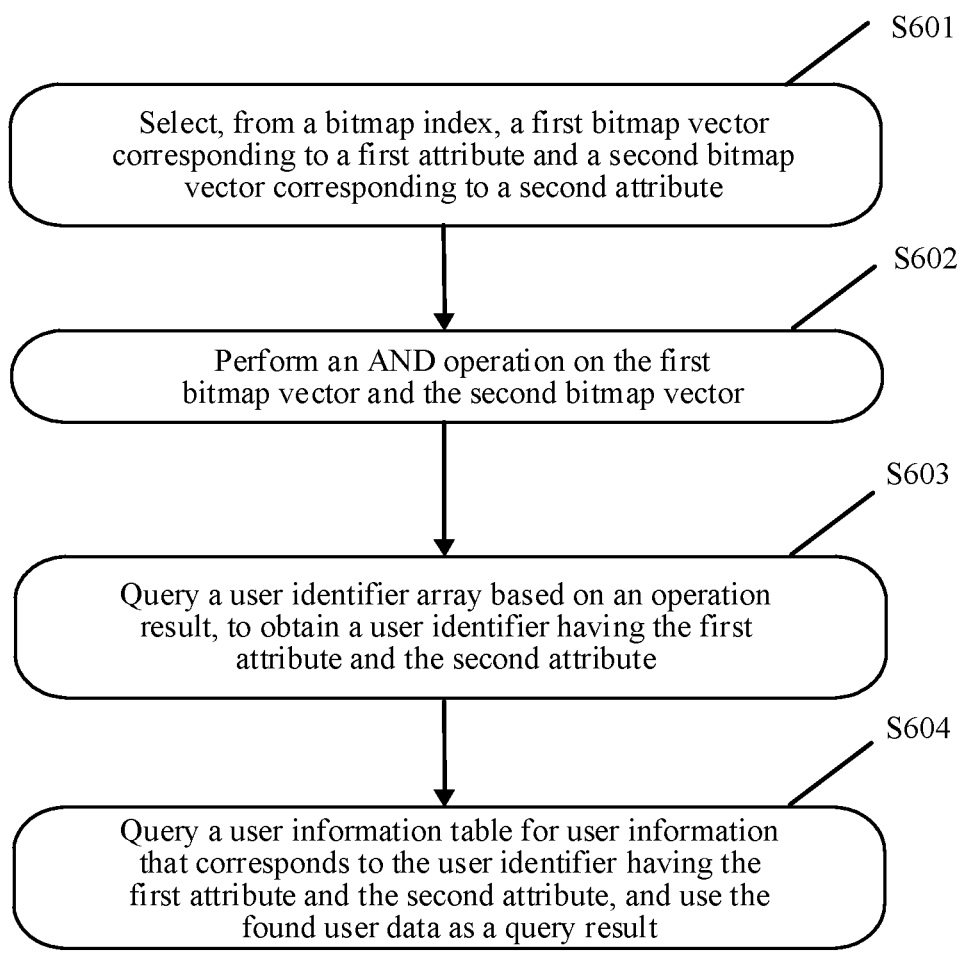
FIG. 4 is a diagram of another sub-procedure of an information processing method according to an embodiment of the present disclosure.

A case in which the at least one attribute value includes a first attribute value and a second attribute value, and the query request is specific to user data having the first attribute value and the second attribute value is described below. For details, refer to FIG. 4. FIG. 4 is a diagram of another sub-procedure of the information processing method according to this embodiment of the present disclosure. In the method shown in FIG. 4, the query request described in step S304 carries the first attribute value and the second attribute value and is specific to the user data having the first attribute value and the second attribute value. In this case, step S305 includes the following steps.

Step S601: Select, from the bitmap index, a first bitmap vector corresponding to the first attribute value and a second bitmap vector corresponding to the second attribute value.

For example, the first attribute value is "male", and the second attribute value is "engineer". An attribute value of "male" is selected based on Table 2 and a first bitmap vector corresponding to "male" is 101100, and an attribute value of "engineer" is selected and a second bitmap vector corresponding to "engineer" is 100010.

Step S602: Perform an AND operation on the first bitmap vector and the second bitmap vector.

The user data having the first attribute value and the second attribute value needs to be queried for, and therefore, an AND operation is performed on the first bitmap vector and the second bitmap vector to obtain, through filtering, a location having the attribute values described above.

For example, an AND operation may be performed on 101100 and 100010, to obtain 100000, indicating that the first user in Table 1 meets the condition.

Step S603: Query the user identifier array based on an operation result, to obtain a user identifier having the first attribute value and the second attribute value.

For example, [0000001, 00000002, 00000003, 00000004, 00000005, 00000006] is queried based on 100000 for the first place, and it may be learned that a user identifier whose attribute values are "male" and "engineer" includes 0000001.

Step S604: Query the user information table for user data that corresponds to the user identifier having the first attribute value and the second attribute value, and use the found user data as the query result.

For example, Table 1 may be queried for user data that corresponds to the user identifier 0000001, and the user data may be used as the query result.

Figure 5:
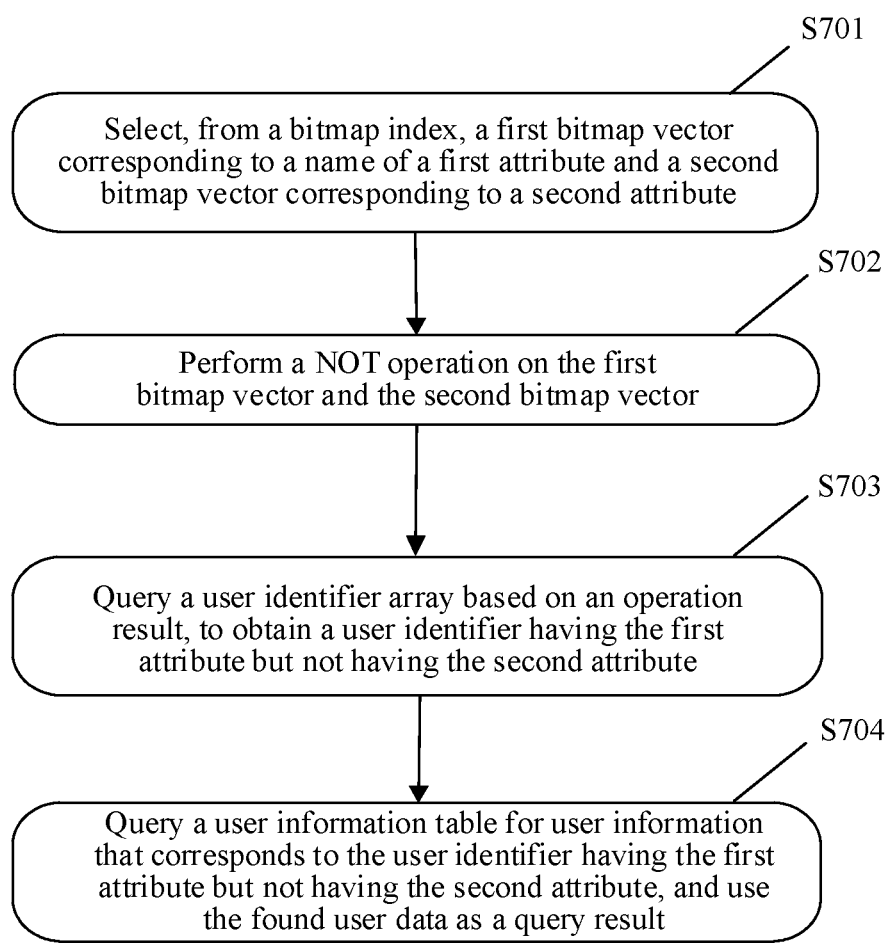
FIG. 5 is a diagram of another sub-procedure of an information processing method according to an embodiment of the present disclosure.

A case in which the at least one attribute value includes a first attribute value and a second attribute value, and the query request is specific to user data having the first attribute value but not having the second attribute value is described below. For details, refer to FIG. 5. FIG. 5 is a diagram of another sub-procedure of the information processing method according to this embodiment of the present disclosure. In the method shown in FIG. 5, the query request described in step S304 carries the first attribute value and the second attribute value and is specific to the user data having the first attribute value but not having the second attribute value. In this case, step S305 includes the following steps.

Step S701: Select, from the bitmap index, a first bitmap vector corresponding to the first attribute value and a second bitmap vector corresponding to the second attribute value.

For example, the first attribute value is "male", and the second attribute value is "engineer". An attribute value of "male" is selected based on Table 2 and a first bitmap vector corresponding to "male" is 101100, and an attribute value of "engineer" is selected and a second bitmap vector corresponding to "engineer" is 100010.

Step S702: Perform a NOT operation on the first bitmap vector and the second bitmap vector.

The user data having the first attribute value but not having the second attribute value needs to be queried for, and therefore, a NOT operation is performed on the first bitmap vector and the second bitmap vector to obtain, through filtering, a location having the first attribute value but not having the second attribute value.

For example, a NOT operation may be performed on 101100 and 100010. In some implementations, a NOT operation is performed first on 100010 to obtain 011101, and an AND operation is then performed on 011101 and 101100 to obtain 001100, indicating that the third and fourth users in Table 1 meet the condition.

Step S703: Query the user location mapping table based on an operation result, to obtain a user identifier having the first attribute value but not having the second attribute value.

For example, [0000001, 00000002, 00000003, 00000004, 00000005, 00000006] is queried based on 001100 for the third and fourth places, and it may be learned that user identifiers whose attribute value is "male" but is not "engineer" include 00000003 and 00000004.

Step S704: Query the user information table for user data that corresponds to the user identifier having the first attribute value but not having the second attribute value, and use the found user data as the query result.

For example, Table 1 may be queried for user data that corresponds to the user identifiers 00000003 and 00000004, and the user data may be used as the query result.

Figure 6:
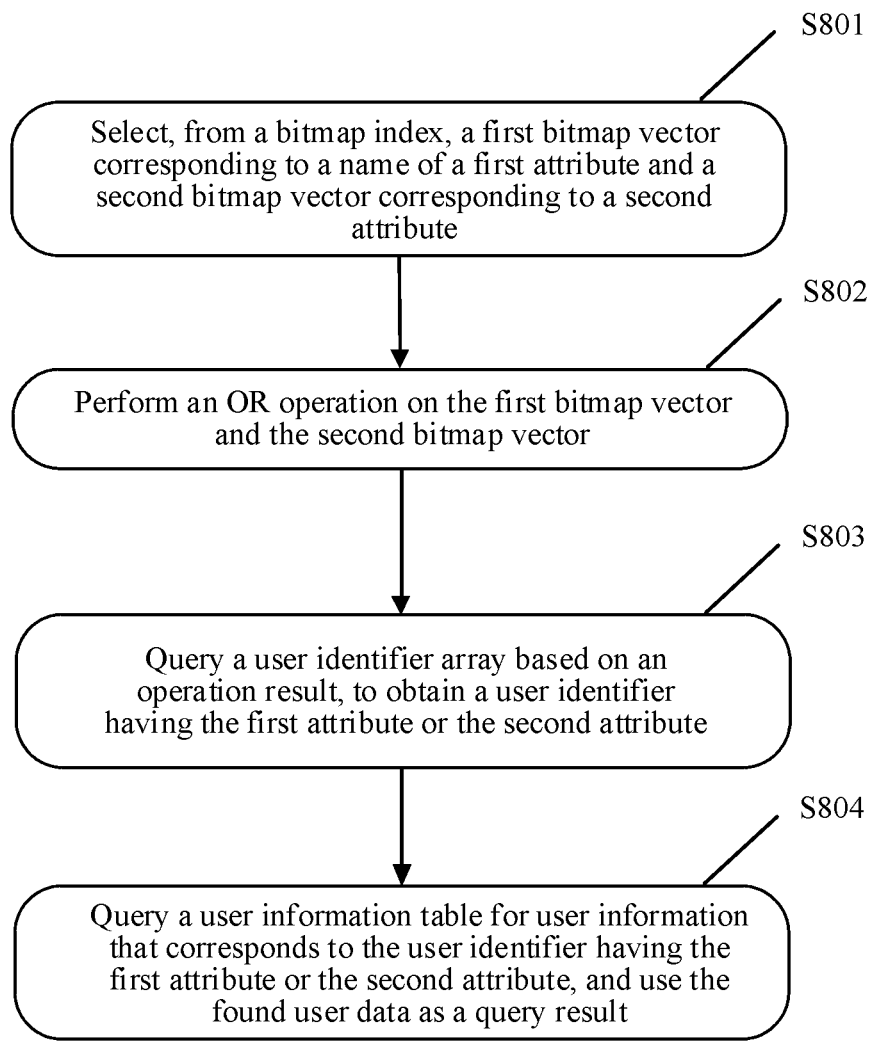
FIG. 6 is a diagram of another sub-procedure of an information processing method according to an embodiment of the present disclosure.

A case in which the at least one attribute value includes a first attribute value and a second attribute value, and the query request is specific to user data having the first attribute value or the second attribute value is described below. For details, refer to FIG. 6. FIG. 6 is a diagram of another sub-procedure of the information processing method according to this embodiment of the present disclosure. In the method shown in FIG. 6, the query request described in step S304 carries the first attribute value and the second attribute value and is specific to the user data having the first attribute value or the second attribute value. In this case, step S305 includes the following steps.

Step S801: Select, from the bitmap index, a first bitmap vector corresponding to the first attribute value and a second bitmap vector corresponding to the second attribute value.

For example, the first attribute value is "male", and the second attribute value is "engineer". An attribute value of "male" is selected based on Table 2 and a first bitmap vector corresponding to "male" is 101100, and an attribute value of "engineer" is selected and a second bitmap vector corresponding to "engineer" is 100010.

Step S802: Perform an OR operation on the first bitmap vector and the second bitmap vector.

The user data having the first attribute value and the second attribute value needs to be queried for, and therefore, an OR operation is performed on the first bitmap vector and the second bitmap vector to obtain, through filtering, a location having any one of the attribute values described above.

For example, an OR operation may be performed on 101100 and 100010, to obtain 101110, indicating that the first, third, fourth, and fifth users in Table 1 meet the condition.

Step S803: Query the user location mapping table based on an operation result, and obtain a user identifier having the first attribute value or the second attribute value.

For example, [0000001, 00000002, 00000003, 00000004, 00000005, 00000006] is queried based on 101110 for the first, third, fourth, and fifth places, and it may be learned that user identifiers whose attribute values are "male" and "engineer" include 0000001, 00000003, 00000004, and 00000005.

It should be noted that, in some other examples, there are still a plurality of query manners. For example, user data having a first attribute value and a second attribute value but not having a third attribute value needs to be queried for. The query manners can be easily conceived of by a person skilled in the art based on the foregoing examples, and are not listed one by one due to limited space.

Step S804: Query the user information table for user data that corresponds to the user identifier having the first attribute value but not having the second attribute value, and use the found user data as the query result.

For example, Table 1 may be queried for user data that corresponds to the user identifiers 0000001, 00000003, 00000004, and 00000005, and the user data may be used as the query result.

Step S306: Send the query result to the client 20.

It should be noted that, in some other examples, there are still a plurality of query manners. For example, user data having a first attribute value and a second attribute value but not having a third attribute value needs to be queried for. Various query combinations can be easily conceived of by a person skilled in the art based on the foregoing examples, and are not listed one by one due to limited space.

In conclusion, according to the information processing method disclosed in this embodiment of the present disclosure, the bitmap index and the user identifier array are constructed based on the user information table. Because location information of the bitmap index compulsorily depends on a user order of the user information table, and the user data is cold data that does not frequently change, once new user data needs to be added to the user information table (that is, user data needs to be added to a bottommost part of the user information table), only a binary number that indicates whether the newly added user data has a corresponding attribute value needs to be correspondingly added to the rear of each bitmap vector in the bitmap index, to modify corresponding index information. A disabling case rather than a deletion case occurs in the user information table, such that the user data is only disabled instead of being deleted from the user information table. Therefore, when the user data is disabled, the bitmap index does not need to be correspondingly modified.

Based on the foregoing description, it can be learned that the information processing method disclosed in this embodiment of the present disclosure can implement second-level indexing for an ad hoc query. Moreover, the information processing method can be universally applied to various databases without a need of modifying the databases or changing an original data insertion and deletion process, thereby facilitating subsequent maintenance.

It should be noted that, in the foregoing embodiment, the user information table may be a user data table.

In some embodiments, the user information table is a user data sub-table obtained after the user data table is partitioned. For example, assuming that the user data table needs to record a hundred million users in total, and if user data is not compressed, each bitmap vector occupies a space of 100000000*1 bit≈12 M, and in this case, it consumes a long time to perform an AND, an OR, and a NOT operation.

In this case, the user information table may be partitioned. For example, every ten million users may be grouped into one partition, and then ten partitions need to be created. Each partition is a user data sub-table, and a bitmap index may be separately created for user data of each user data sub-table. After partitions are used, a value of a bitmap vector in a bitmap index occupies a space of 10000000*1 bit≈1.5 M. The processing method shown in FIG. 2 is performed on each of the user data sub-tables, and query results obtained for the partitions are collected and sent to the client 20.

A partition can reduce an occupation space of a value of a bitmap vector, and therefore, when there is an extremely large data volume, a processing speed can be significantly increased.

Figure 7:
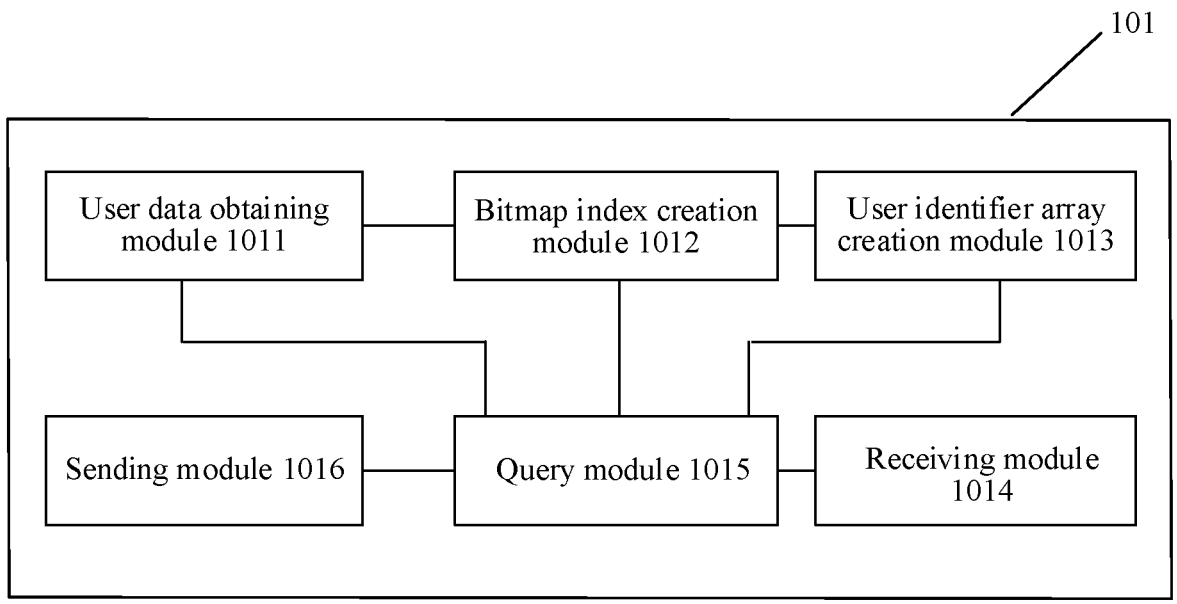
FIG. 7 is a diagram of an apparatus structure of an information processing apparatus according to an embodiment of the present disclosure.

An embodiment of the present disclosure further provides an information processing apparatus. For details, refer to FIG. 7. FIG. 7 is a schematic diagram of an apparatus structure of the information processing apparatus according to this embodiment of the present disclosure. As shown in FIG. 7, the information processing apparatus 101 includes: a user data obtaining module 1011 configured to obtain a user information table, where the user information table includes user identifiers and user data, the user data includes a plurality of attributes, the attributes include attribute values, and the user information table records correspondences between the user identifiers and the attribute values of the plurality of attributes; a bitmap index creation module 1012 configured to create, based on the user information table, a bitmap index including a plurality of bitmap vectors, where each attribute value corresponds to a bitmap vector, and a ranking order of binary numbers in each bitmap vector is consistent with a ranking order of the user identifiers in the user information table; a user identifier array creation module 1013 configured to create a user identifier array based on the user information table, where in the user identifier array, the user identifiers are recorded in the ranking order of the user identifiers in the user information table; a receiving module 1014 configured to receive a query request sent by a client 20, where the query request carries at least one attribute value in the plurality of attribute values; a query module 1015 configured to query the user information table based on the bitmap index, the user identifier array, and the at least one attribute value, to obtain a query result; and a sending module 1016 configured to send the query result to the client 20.

Optionally, the at least one attribute value includes a first attribute value, the query request carries the first attribute value, the query request is specific to user data having the first attribute value, and the query module 1015 is configured to: select, from the bitmap index, a first bitmap vector corresponding to the first attribute value; query the user identifier array based on the first bitmap vector, to obtain a user identifier having the first attribute value; and query the user information table for user data that corresponds to the user identifier having the first attribute value, and use the found user data as the query result.

Optionally, the at least one attribute value includes a first attribute value and a second attribute value, the query request carries the first attribute value and the second attribute value, the query request is specific to user data having the first attribute value and the second attribute value, and the query module 1015 is configured to: select, from the bitmap index, a first bitmap vector corresponding to the first attribute value and a second bitmap vector corresponding to the second attribute value; perform an AND operation on the first bitmap vector and the second bitmap vector; query the user identifier array based on an operation result, to obtain a user identifier having the first attribute value and the second attribute value; and query the user information table for user data that corresponds to the user identifier having the first attribute value and the second attribute value, and use the found user data as the query result.

Optionally, the at least one attribute value includes a first attribute value and a second attribute value, the query request carries the first attribute value and the second attribute value, the query request is specific to user data having the first attribute value but not having the second attribute value, and the query module 1015 is configured to: select, from the bitmap index, a first bitmap vector corresponding to the first attribute value and a second bitmap vector corresponding to the second attribute value; perform a NOT operation on the first bitmap vector and the second bitmap vector; query the user location mapping table based on an operation result, to obtain a user identifier having the first attribute value but not having the second attribute value; and query the user information table for user data that corresponds to the user identifier having the first attribute value but not having the second attribute value, and use the found user data as the query result.

Optionally, the at least one attribute value includes a first attribute value and a second attribute value, the query request carries the first attribute value and the second attribute value, the query request is specific to user data having the first attribute value or the second attribute value, and the query module 1015 is configured to: select, from the bitmap index, a first bitmap vector corresponding to the first attribute value and a second bitmap vector corresponding to the second attribute value; perform an OR operation on the first bitmap vector and the second bitmap vector; query the user location mapping table based on an operation result, to generate a user identifier having the first attribute value or the second attribute value; and query the user information table for user data that corresponds to the user identifier having the first attribute value or the second attribute value, and use the found user data as the query result.

Optionally, the user information table is a user data table, or a user data sub-table obtained after the user data table is partitioned.

Optionally, the user identifiers are ranked in a preset order in the user information table, and the preset order includes an ascending order and a descending order.

In conclusion, according to the information processing apparatus disclosed in this embodiment of the present disclosure, the bitmap index and the user identifier array are constructed based on the user information table. Because location information of the bitmap index compulsorily depends on a user order of the user information table, and the user data is cold data that does not frequently change, once new user data needs to be added to the user information table (that is, user data needs to be added to a bottommost part of the user information table), only a binary number that indicates whether the newly added user data has a corresponding attribute value needs to be correspondingly added to the rear of each bitmap vector in the bitmap index, to modify corresponding index information. A disabling case rather than a deletion case occurs in the user information table, such that the user data is only disabled instead of being deleted from the user information table. Therefore, when the user data is disabled, the bitmap index does not need to be correspondingly modified.

Based on the foregoing description, it can be learned that the information processing apparatus disclosed in this embodiment of the present disclosure can implement second-level indexing for an ad hoc query. Moreover, the information processing apparatus can be universally applied to various databases without a need of modifying the databases or changing an original data insertion and deletion process, thereby facilitating subsequent maintenance.

Figure 8:
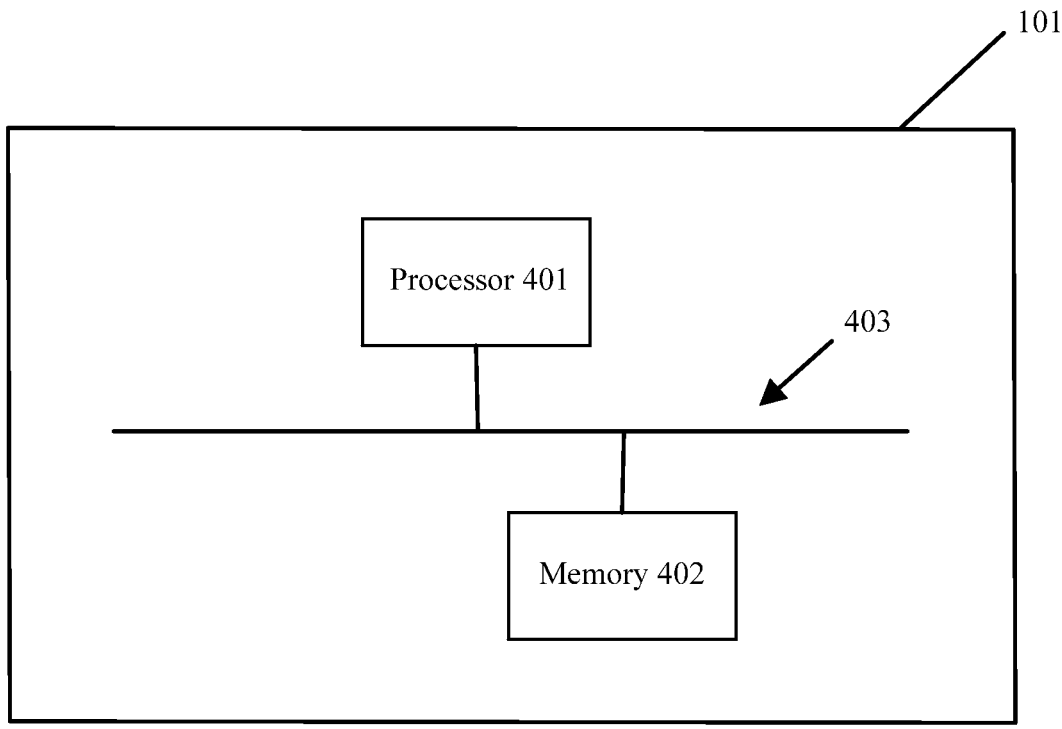
FIG. 8 is a diagram of another apparatus structure of an information processing apparatus according to an embodiment of the present disclosure.

Further, FIG. 8 is a diagram of another apparatus structure of an information processing apparatus according to an embodiment of the present disclosure. The information processing apparatus 101 includes a processor 401, a memory 402, and a bus 403. The processor 401 and the memory 402 are both connected to the bus 403. The memory 402 stores a program instruction, and the processor 401 runs the program instruction to perform the methods in the embodiments corresponding to FIG. 2 to FIG. 6.

In conclusion, according to the information processing apparatus disclosed in this embodiment of the present disclosure, the bitmap index and the user identifier array are constructed based on the user information table. Because location information of the bitmap index compulsorily depends on a user order of the user information table, and the user data is cold data that does not frequently change, once new user data needs to be added to the user information table (that is, user data needs to be added to a bottommost part of the user information table), only a binary number that indicates whether the newly added user data has a corresponding attribute value needs to be correspondingly added to the rear of each bitmap vector in the bitmap index, to modify corresponding index information. A disabling case rather than a deletion case occurs in the user information table, such that the user data is only disabled instead of being deleted from the user information table. Therefore, when the user data is disabled, the bitmap index does not need to be correspondingly modified.

Based on the foregoing description, it can be learned that the information processing apparatus disclosed in this embodiment of the present disclosure can implement second-level indexing for an ad hoc query. Moreover, the information processing apparatus can be universally applied to various databases without a need of modifying the databases or changing an original data insertion and deletion process, thereby facilitating subsequent maintenance.

It should be noted that any described apparatus embodiment is merely an example. The units described as separate parts may or may not be physically separate, and parts displayed as units may or may not be physical units, may be located in one position, or may be distributed on a plurality of network units. Some or all of the processes may be selected according to actual needs to achieve the objectives of the solutions of the embodiments. In addition, in the accompanying drawings of the apparatus embodiments provided in the present disclosure, connection relationships between processes indicate that the processes have communication connections with each other, which may be implemented as one or more communications buses or signal cables. A person of ordinary skill in the art may understand and implement the embodiments of the present disclosure without creative efforts.

Based on the description of the foregoing implementations, a person skilled in the art may clearly understand that the present disclosure may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented using corresponding hardware. Moreover, a specific hardware structure used to implement a same function may be in various forms, for example, in a form of an analog circuit, a digital circuit, a dedicated circuit, or the like. However, as for the present disclosure, software program implementation is a better implementation in most cases. Based on such an understanding, the technical solutions of the present disclosure or the part contributing to other approaches may be implemented in a form of a software product. The computer software product is stored in a readable storage medium, such as a floppy disk, a USB flash drive, a removable hard disk, a read-only memory (ROM), a random access memory (RAM), a magnetic disk, or a compact disc of a computer, and includes several instructions for instructing a computer device (which may be a personal computer, a server, a network device, or the like) to perform the methods described in the embodiments of the present disclosure.

It may be clearly understood by a person skilled in the art that, for a detailed working process of the described system, apparatus, or unit, refer to a corresponding process in the method embodiments. Details are not described herein again.

The foregoing descriptions are only example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information processing method, comprising:
    obtaining a user information table, wherein the user information table comprises user identifiers and user data, wherein the user data comprises a plurality of attributes having a plurality of attribute values, and wherein the user information table records correspondences between the user identifiers and the plurality of attribute values;
    creating, based on the user information table, a bitmap index comprising a plurality of bitmap vectors, wherein each attribute value corresponds to a bitmap vector, and wherein a ranking order of binary numbers in each bitmap vector is consistent with a ranking order of the user identifiers in the user information table;
    creating, based on the user information table, a user identifier array comprising the user identifiers recorded in the ranking order of the user identifiers in the user information table;
    receiving a query request from a client, wherein the query request carries at least one attribute value in the plurality of attribute values;
    querying the user information table based on the bitmap index, the user identifier array, and the at least one attribute value to obtain a query result; and
    sending the query result to the client.

2. The information processing method according to claim 1, wherein the at least one attribute value comprises a first attribute value, wherein the query request carries the first attribute value, and wherein the query request is specific to a user having the first attribute value.

3. The information processing method according to claim 2, wherein querying the user information table to obtain the query result comprises:
    selecting, from the bitmap index, a first bitmap vector corresponding to the first attribute value;
    querying the user identifier array, based on the first bitmap vector, to obtain a user identifier having the first attribute value;
    querying the user information table for first user data that corresponds to the user identifier having the first attribute value; and
    using the first user data as the query result.

4. The information processing method according to claim 1, wherein the at least one attribute value comprises a first attribute value and a second attribute value, wherein the query request carries the first attribute value and the second attribute value, and wherein the query request is specific to a user having the first attribute value and the second attribute value.

5. The information processing method according to claim 4, wherein querying the user information table to obtain the query result comprises:
    selecting, from the bitmap index, a first bitmap vector corresponding to the first attribute value and a second bitmap vector corresponding to the second attribute value;
    performing an AND operation on the first bitmap vector and the second bitmap vector;
    querying the user identifier array, based on an operation result of the AND operation, to obtain a user identifier having the first attribute value and the second attribute value;
    querying the user information table for first user data that corresponds to the user identifier having the first attribute value and the second attribute value; and
    using the first user data as the query result.

6. The information processing method according to claim 1, wherein the at least one attribute value comprises a first attribute value and a second attribute value, wherein the query request carries the first attribute value and the second attribute value, and wherein the query request is specific to a user having the first attribute value but not having the second attribute value.

7. The information processing method according to claim 6, wherein querying the user information table to obtain the query result comprises:
    selecting, from the bitmap index, a first bitmap vector corresponding to the first attribute value and a second bitmap vector corresponding to the second attribute value;
    performing a NOT operation on the first bitmap vector and the second bitmap vector;
    querying a user location mapping array, based on an operation result of the NOT operation, to obtain a user identifier having the first attribute value but not having the second attribute value;
    querying the user information table for first user data that corresponds to the user identifier having the first attribute value but not having the second attribute value; and
    using the first user data as the query result.

8. The information processing method according to claim 1, wherein the at least one attribute value comprises a first attribute value and a second attribute value, wherein the query request carries the first attribute value and the second attribute value, and wherein the query request is specific to a user having the first attribute value or the second attribute value.

9. The information processing method according to claim 8, wherein querying the user information table to obtain the query result comprises:
selecting, from the bitmap index, a first bitmap vector corresponding to the first attribute value and a second bitmap vector corresponding to the second attribute value;
performing an OR operation on the first bitmap vector and the second bitmap vector;
querying a user location mapping table, based on an operation result of the OR operation, to obtain a user identifier having the first attribute value or the second attribute value;
querying the user information table for first user data that corresponds to the user identifier having the first attribute value or the second attribute value; and
using the first user data as the query result.

10. The information processing method according to claim 1, further comprising adding new user data to the user information table by adding a single binary number to each of the plurality of bitmap vectors in the bitmap index, wherein the single binary number indicates whether the new user data has a corresponding attribute value, and wherein the user information table is one of a user data table or a user data sub-table obtained after the user data table is partitioned.

11. The information processing method according to claim 1, further comprising disabling a portion of the user data without deleting the portion of the user data from the information table, wherein the user identifiers are ranked in a preset order in the user information table, and wherein the preset order comprises at least one of an ascending order or a descending order.

12. An information processing apparatus, comprising:
a processor;
a memory coupled to the processor; and
a bus, wherein the processor and the memory are both connected to the bus, and wherein the memory stores a program instruction that the processor executes to enable the information processing apparatus to:
obtain a user information table, wherein the user information table comprises user identifiers and user data, wherein the user data comprises a plurality of attributes having a plurality of attribute values, and wherein the user information table records correspondences between the user identifiers and the plurality of attribute values;
create, based on the user information table, a bitmap index comprising a plurality of bitmap vectors, wherein each attribute value corresponds to a bitmap vector, and wherein a ranking order of binary numbers in each bitmap vector is consistent with a ranking order of the user identifiers in the user information table;
create a user identifier array based on the user information table, wherein in the user identifier array, the user identifiers are recorded in the ranking order of the user identifiers in the user information table;
receive a query request from a client, wherein the query request carries at least one attribute value in the plurality of attribute values;
query the user information table based on the bitmap index, the user identifier array, and the at least one attribute value, to obtain a query result; and
send the query result to the client.

13. The information processing apparatus according to claim 12, wherein the at least one attribute value comprises a first attribute value, wherein the query request carries the first attribute value, and wherein the query request is specific to a user having the first attribute value.

14. The information processing apparatus according to claim 13, wherein the processor executes the program instruction to enable the information processing apparatus to:
select, from the bitmap index, a first bitmap vector corresponding to the first attribute value;
query the user identifier array based on the first bitmap vector, to obtain a user identifier having the first attribute value;
query the user information table for first user data that corresponds to the user identifier having the first attribute value; and
use the first user data as the query result.

15. The information processing apparatus according to claim 12, wherein the at least one attribute value comprises a first attribute value and a second attribute value, wherein the query request carries the first attribute value and the second attribute value, and wherein the query request is specific to a user having the first attribute value and the second attribute value.

16. The information processing apparatus according to claim 15, wherein the processor executes the program instruction to enable the information processing apparatus to:
select, from the bitmap index, a first bitmap vector corresponding to the first attribute value and a second bitmap vector corresponding to the second attribute value;
perform an AND operation on the first bitmap vector and the second bitmap vector;
query the user identifier array, based on an operation result of the AND operation, to obtain a user identifier having the first attribute value and the second attribute value;
query the user information table for first user data that corresponds to the user identifier having the first attribute value and the second attribute value; and
use the first user data as the query result.

17. The information processing apparatus according to claim 12, wherein the at least one attribute value comprises a first attribute value and a second attribute value, wherein the query request carries the first attribute value and the second attribute value, wherein the query request is specific to a user having the first attribute value but not having the second attribute value, and wherein the processor executes the program instruction to enable the information processing apparatus to:
select, from the bitmap index, a first bitmap vector corresponding to the first attribute value and a second bitmap vector corresponding to the second attribute value;
perform a NOT operation on the first bitmap vector and the second bitmap vector;
query a user location mapping array, based on an operation result of the NOT operation, to obtain a user identifier having the first attribute value but not having the second attribute value;
query the user information table for first user data that corresponds to the user identifier having the first attribute value but not having the second attribute value; and
use the first user data as the query result.

18. The information processing apparatus according to claim 12, wherein the at least one attribute value comprises a first attribute value and a second attribute value, wherein the query request carries the first attribute value and the second attribute value, wherein the query request is specific to a user having the first attribute value or the second attribute value, and wherein the processor executes the program instruction to enable the information processing apparatus to:

select, from the bitmap index, a first bitmap vector corresponding to the first attribute value and a second bitmap vector corresponding to the second attribute value;

perform an OR operation on the first bitmap vector and the second bitmap vector;

query a user location mapping table, based on an operation result of the OR operation, to obtain a user identifier having the first attribute value or the second attribute value;

query the user information table for first user data that corresponds to the user identifier having the first attribute value or the second attribute value; and use the first user data as the query result.

19. The information processing apparatus according to claim 12, wherein the user information table is one of a user data table or a user data sub-table obtained after the user data table is partitioned, and wherein the processor executes the program instruction to enable the information processing apparatus to disable a portion of the user data without modifying the bitmap index.

20. The information processing apparatus according to claim 12, wherein the user identifiers are ranked in a preset order in the user information table, and wherein the preset order comprises at least one of an ascending order or a descending order.

* * * * *